(12) United States Patent
Forsyth et al.

(10) Patent No.: US 8,357,745 B2
(45) Date of Patent: Jan. 22, 2013

(54) WAX-CONTAINING MATERIALS

(75) Inventors: Jeffrey Forsyth, Inverurie (GB); Philip Fletcher, Cambridgeshire (GB)

(73) Assignee: Oilflow Solutions Holdings Limited, Lancashire (GB)

( * ) Notice: Subject to any disclaimer, the term of this patent is extended or adjusted under 35 U.S.C. 154(b) by 584 days.

(21) Appl. No.: 11/887,828

(22) PCT Filed: Mar. 27, 2006

(86) PCT No.: PCT/GB2006/001112
§ 371 (c)(1),
(2), (4) Date: Nov. 28, 2007

(87) PCT Pub. No.: WO2006/106300
PCT Pub. Date: Oct. 12, 2006

(65) Prior Publication Data
US 2009/0005490 A1    Jan. 1, 2009

(30) Foreign Application Priority Data
Apr. 4, 2005 (GB) .................................... 0506795.4

(51) Int. Cl.
*C08K 3/20* (2006.01)
(52) U.S. Cl. .......................... 524/475; 524/487; 524/612
(58) Field of Classification Search .................... 524/475
See application file for complete search history.

(56) References Cited

U.S. PATENT DOCUMENTS

| | | | |
|---|---|---|---|
| 3,394,097 A | 7/1968 | Bissot | |
| 3,525,636 A | 8/1970 | Bogart | |
| 4,007,791 A * | 2/1977 | Johnson | 166/300 |
| 4,387,028 A * | 6/1983 | Fee | 210/708 |
| 4,508,858 A | 4/1985 | Luetzelschwab | |
| 4,559,202 A | 12/1985 | Luetzelschwab | |
| 4,576,978 A | 3/1986 | Luetzelschwab | |
| 4,603,154 A | 7/1986 | Luetzelschwab | |
| 4,693,321 A | 9/1987 | Royer | |
| 4,757,833 A | 7/1988 | Danley | |
| 4,795,478 A | 1/1989 | Layrisse et al. | |
| 4,896,723 A | 1/1990 | Hoskin et al. | |
| 4,906,495 A * | 3/1990 | Martini et al. | 428/36.7 |
| 4,934,398 A * | 6/1990 | Chirinos et al. | 137/13 |
| 4,971,707 A * | 11/1990 | Osterloh | 507/254 |
| 5,013,462 A | 5/1991 | Danley | |
| 5,024,676 A | 6/1991 | Moriyama et al. | |
| 5,411,558 A | 5/1995 | Taniguchi et al. | |
| 5,437,696 A | 8/1995 | Verkade et al. | |
| 5,551,956 A | 9/1996 | Moriyama et al. | |

(Continued)

FOREIGN PATENT DOCUMENTS

DE       103 09 571 A1    9/2004

(Continued)

OTHER PUBLICATIONS

Hyne, Norman, Nontechnical Guide to Petroleum Geology, Exploration, Driiling and Production, 2001.*

(Continued)

*Primary Examiner* — Doris Lee
(74) *Attorney, Agent, or Firm* — Nixon & Vanderhye

(57) ABSTRACT

Wax-containing crude oils are treated with polyvinyl alcohol, which is optionally cross-linked, to improve the mobility of the oil and thereby facilitate its transport between its point of production and a point downstream thereof.

26 Claims, 2 Drawing Sheets

U.S. PATENT DOCUMENTS

Figure 1:
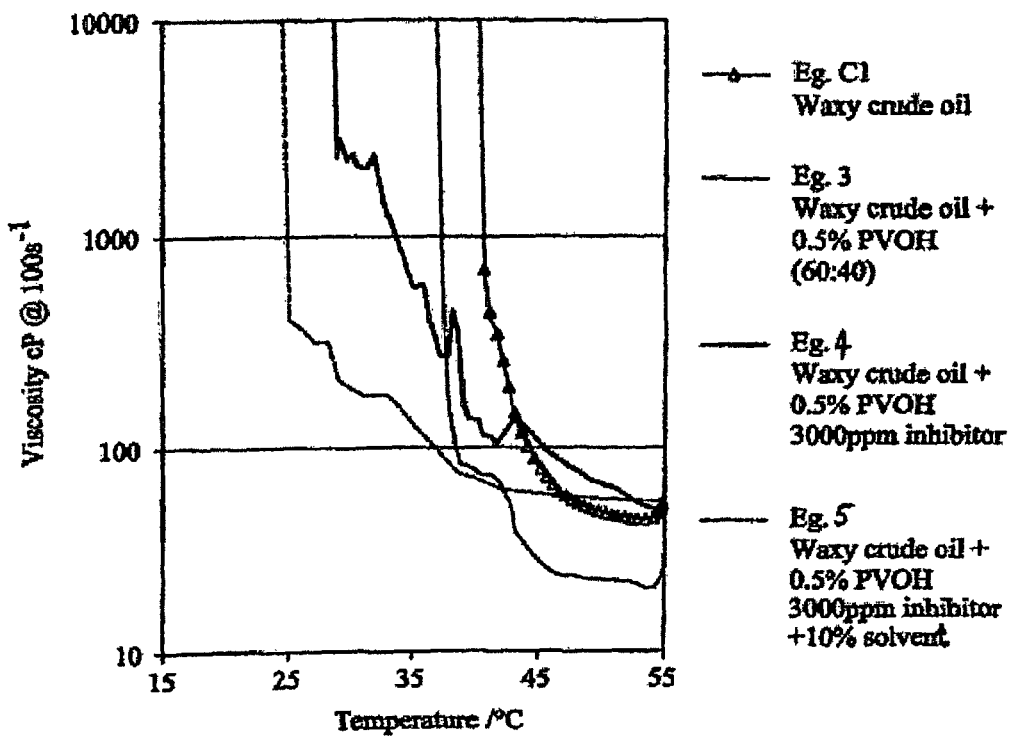

| | | | |
|---|---|---|---|
| 5,641,433 A | 6/1997 | Chirinos et al. | |
| 5,935,423 A * | 8/1999 | Crane et al. | 208/348 |
| 6,451,885 B1 * | 9/2002 | Dresin et al. | 524/60 |
| 6,848,502 B2 * | 2/2005 | Bishop et al. | 165/154 |
| 2002/0040123 A1 * | 4/2002 | Patil et al. | 528/392 |
| 2005/0049327 A1 | 3/2005 | Jovancicevic et al. | |
| 2005/0085395 A1 | 4/2005 | Dikland et al. | |
| 2005/0209368 A1 | 9/2005 | Yang et al. | |

FOREIGN PATENT DOCUMENTS

| | | |
|---|---|---|
| EP | 0 190 553 A1 | 8/1986 |
| EP | 0 669 377 A1 | 8/1995 |
| WO | WO 03/016397 A1 | 2/2003 |
| WO | WO 2005/040669 A1 | 5/2005 |
| WO | WO 2005/100517 A1 | 10/2005 |

OTHER PUBLICATIONS

Patent Abstracts of Japan, vol. 017, No. 554 (C-1118), Oct. 6, 1993 & JP 05 156208 A (Kuraray Co. Ltd.) Jun. 22, 1993 (abstract).

US 5,772,706, 06/1998, Schield et al. (withdrawn)

* cited by examiner

WAX-CONTAINING MATERIALS

This application is the U.S. National Phase of International Application PCT/GB2006/001112, filed 27 Mar. 2006, which designated the U.S. PCT/GB2006/001112 claims priority to British Application No. 0506795.4 filed 4 Apr. 2005. The entire content of these applications are incorporated herein by reference.

This invention relates to wax-containing materials and particularly, although not exclusively, relates to maintaining and/or improving mobility of wax-containing fluids to facilitate their flow between two locations. Preferred embodiments relate to maintaining and/or improving mobility of waxy crude oils to facilitate their transport between places where they are produced and points downstream thereof.

Crude oil is a mixture containing up to 50 saturated hydrocarbons, predominantly alkanes (paraffins). Alkanes in crude oil vary in molecular weight from 16 to 600 and have the general formula $C_nH_{2n+2}$, wherein n is an integer.

Alkanes containing fewer than 5 carbon atoms per molecule are usually gaseous at room temperature, those having 5 to 15 carbon atoms are usually liquids, and the straight-chain alkanes having more than 15 carbon atoms per molecule are solids. These higher molecular weight straight-chain alkanes, (formulas ranging form $C_{15}H_{32}$ to $C_{40}H_{82}$) are known as paraffin waxes and have melting points ranging form about 35° C. to 100° C. Below their melting points they are greasy solids, ranging in hardness from soft and pliable through to hard and brittle.

The paraffin wax content of crude oils may vary from less than 1 wt % to over 30 wt %. At temperatures above or close to their melting points, paraffin waxes in crude oil remain in the liquid state, being both molten at high temperature and also dissolved to some extent by the lower molecular weight alkanes in the oil. At progressively decreasing temperatures, paraffin waxes can precipitate from oils, agglomerate, and become entrapped in the oil structure or vice versa.

The Wax Appearance Temperature for any oil (WAT) is defined as the temperature at which wax crystals first appear upon cooling. It may be measured by ASTM method D3117 and reference to WATs herein are measured according to the method unless otherwise stated. At the WAT, the fluid normally remains liquid, but contains wax crystals dispersed throughout the fluid. The presence of these wax crystals contributes to major changes in the rheological properties of the oil. The amount of solid wax needed to modify oil rheology and result in significant gelation can be as low as a few percent. As temperatures cool below the WAT, more wax is precipitated leading to large increases in viscosity. In some cases this can lead to the conversion of the oil into a rigid immobile solid.

The temperature below which the oil is too viscous to pour is defined as the pour point. The pour point is generally between 5° C. and 30° C. lower than the WAT. The solubility of waxes in oils, and therefore the WATs and pour points, are influenced strongly by the composition of the oil, in particular the total wax content and the proportions of lower molecular weight alkanes.

The precipitation of waxes from crude oils is a major problem for the oil industry since it makes it difficult to transport oil from its point of production to the surface. Also, since it can occur in pipelines, fluid transport in the pipeline may be reduced due to an increase in the viscosity of the fluid and/or a reduction in pipe internal diameters through deposition and adherence of wax particles on internal pipe surfaces.

The management of wax problems in oilfield pipelines has involved several approaches. First, the crude oil may be treated thermally to keep its temperature above a temperature at which wax particles may precipitate. Examples of such thermal approaches are described in U.S. Pat. No. 3,908,763 and U.S. Pat. No. 4,328,865. Secondly, and most common, are chemical treatments wherein the mobility of waxy crude oil below the pour point of the oil is maintained by some kind of chemical pre-treatment. Commonly, this involves the addition of a chemical, at concentrations between 50 and 4000 ppm, to improve the rheology of the oil. Chemicals used are believed to modify the oil morphology, regulate the number and size of precipitated wax crystals, or prevent their agglomeration. This chemical approach, generally known as wax control, has been under development for over 30 years. The chemicals, which may be surfactants, polymers, solvents or waxes themselves, are often referred to as wax inhibitors or wax dispersants. Different inhibitors work by different mechanisms. They are often limited in their ability to improve the mobility of crude oil having wax contents much above 15%.

Another chemical method for enhancing the mobility of waxy crude oils involves diluting the crude oil with large amounts of solvents, which dissolve or soften wax deposits. Solvents such as kerosene or oil refinery condensates can be used in this mode and can be used in combination with wax inhibitors to enhance the performance of the inhibitor. Typically, bulk solvent concentrations can be up to 40% by weight in oil/solvent mixtures. Although effective, solvent dilution can increase the cost of oil production by increasing the equipment requirement to transport and use such large volumes of solvent.

Selecting an appropriate means of addressing wax problems is often dependent upon a number of factors. Some factors relate to the oil itself and include its pour point. Other factors may be commercial. For example, the cost and effectiveness of chemicals used to lower the pour point may be compared to the cost of keeping a pipeline above the pour point, for example by heating it, burying it and/or by insulating it by other means. Also the cost involved in employing wider inside diameter pipes or larger pumps to facilitate oil movement will need to be assessed and compared to other means of addressing the problem.

It is an object of the present invention to address the above-described problems and particularly, although not exclusively, to provide a means to facilitate the flow of crude oils containing relatively high levels of waxes along pipelines.

According to a first aspect of the invention, there is provided a method of treating a wax-containing material for improving the mobility thereof, said method comprising contacting the material with a treatment fluid formulation, said treatment fluid formulation comprising a polymeric material AA which includes —O— moieties pendent from a polymeric backbone thereof, wherein polymeric material AA is optionally cross-linked.

Said wax-containing material may have a Wax Appearance Temperature (WAT) before contact with said treatment fluid formulation of less than 100° C. or less than 80° C.

Said wax-containing material may have a pour point measured in accordance with ASTM D97 of less than 150° C., preferably less than 100° C., more preferably less than 80° C. especially less than 60° C. before contact with said treatment fluid formulation. The pour point may be in the range −20° C. to 70° C.

In the context of a wax-containing crude oil, the aforementioned pour point suitably refers to the pour point as measured after light fractions of a live oil have been flared off or otherwise have been removed from the oil. Suitably, therefore, the aforementioned pour point refers to the pour point of the oil in the form it is to be transported, for example in a fluid flow path as described herein, before any treatment of the oil to decrease its pour point.

Said wax-containing material may have a pour point at the levels as aforementioned immediately prior to contact with said treatment fluid formulation.

An improvement in the mobility of the wax-containing material may be apparent by comparing the pour point of a sample of said wax-containing material immediately before treatment to the pour point after treatment, using the ASTM D97 method described above. The pour point may be reduced by at least 1° C., suitably at least 5° C., preferably at least 10° C., especially at least 20° C.

The viscosity of the wax-containing material after treatment as described herein is preferably sufficiently low to enable the material to be transported under selected conditions (e.g. through a particular pipe at a particular temperature, using a particular pump pressure etc).

The method may be used to reduce the viscosity of many types of wax-containing materials provided that the wax-containing materials can be caused to form a dispersion when contacted with said treatment fluid formulation. Said wax-containing material is preferably a wax-containing fluid at a temperature of at least 150° C., preferably at least 100° C., more preferably at least 80° C., especially at least 60° C. It is preferably an oil. It preferably comprises a wax-containing crude oil.

Said wax-containing material may comprise a material derived from an heavy oil reservoir and/or from tar sand deposits. It may comprise a material derived from a deep well wherein the composition may be sufficiently warm down the well to enable it to flow; but the viscosity rises as the composition is withdrawn from the well (and cools) making it more difficult to flow.

Said method of the first aspect is preferably for treating a wax-containing material which is arranged to flow along a fluid flow path.

Said treatment fluid formulation is preferably not injected into an injection well of a subterranean formation in order to contact said wax-containing material.

Said treatment fluid formulation is preferably initially contacted with said wax-containing material at or downstream of a production means, for example at or downstream of a producing face of a subterranean formation. In one, less preferred, embodiment, said treatment fluid formulation may be initially contacted with said wax-containing material below ground (for example at or adjacent to a producing face of a subterranean formation) to reduce the viscosity of said wax-containing material below ground and facilitate its transport to the surface. In another, preferred embodiment, said treatment fluid formulation may be contacted with said wax-containing material at or adjacent the surface of the ground after the wax-containing material has been transported to the surface, for example using heavy pumps.

Said treatment fluid formulation is preferably initially contacted with said wax-containing material at or downstream of a position in a fluid flow path wherein light fractions of a live oil have been removed, for example by being flared off.

Said treatment fluid formulation is preferably not used to drive the wax-containing material through a subterranean formation.

Said fluid flow path is preferably defined by a conduit means.

Said conduit means preferably includes a first conduit part (e.g. a pipeline) which is arranged downstream of a production means, preferably above ground level. Said first conduit part preferably contains said wax-containing material after contact with the treatment fluid formulation.

Said first conduit part may be circular in cross-section. Said part may have a cross-sectional area for at least part of its length of at least 5 cm, preferably at least 10 cm. In some cases, the cross-section may have a diameter of up to 0.5 m. Said first conduit part preferably extends away from a position where the wax-containing material is produced, suitably in a transverse direction to the vertical. Said first conduit part may have a length of at least 5 m, preferably at least 20 m, especially at least 100 m. In some cases, said first conduit part may have a length of more than 1,000 m, more than 5,000 m, more than 10,000 m, even more than 500 km. Long pipes may be arranged to deliver a wax-containing crude oil to a refinery; such pipes may extend partly above and partly below ground.

Said fluid flow path (e.g. said conduit means) may extend between a first point, remote from the point of production of the wax-containing material, and a second point closer to, for example at or adjacent to, the point of production of the wax-containing material. Said first point may be above ground and may be, for example, a refinery; said second point may be closer to the producing face of a subterranean formation. It may be at or adjacent to the producing face.

Said fluid flow path may be defined, in part, by a second conduit part which extends upwardly from below ground to above ground. Said second conduit part may be a riser pipe.

Said treatment fluid formulation is preferably arranged to disperse and/or emulsify said wax-containing material (e.g. oil and waxes) on contact therewith. Said wax-containing material may not be substantially particulate prior to contact with said treatment fluid formulation—it may be in the form of a substantially homogenous fluidic mass. Preferably, flow along said fluid flow path is turbulent, at least in part, thereby to facilitate formation of said dispersion and/or emulsion. Preferably, flow is turbulent at the point of initial contact of said wax-containing material with said treatment fluid formulation so that said composition is dispersed and/or emulsified on contact with said formulation.

At least after contact between said treatment fluid formulation and said wax-containing material, it is preferred to subject the components to high shear to mix them.

In the method, a delivery flow path is preferably defined which is arranged to communicate with said fluid flow path wherein said treatment fluid formulation is dosed into said wax-containing material in said fluid flow path via said delivery flow path. Said fluid flow path may be formed into a mixing means, for example a mixing chamber, with which said delivery flow path may communicate for mixing treatment fluid formulation and wax-containing material. Said delivery flow path preferably communicates with said fluid flow path at or downstream of a producing face of the subterranean formation.

In the method of the first aspect, said wax-containing material is preferably at a temperature above its pour point when initially contacted with said treatment fluid formulation. It may be at least 2° C., preferably at least 5° C. above its pour point. Said treatment fluid formulation is at the time it is initially contacted with said treatment fluid formulation preferably at a temperature above the pour point of the wax-containing material it is contacted with.

The ratio of the flow rate (in weight per unit time) of treatment fluid formulation in said delivery flow path to the flow rate (in the same units) of wax-containing material in said fluid flow path may be in the range 0.1 to 2.5, preferably in the range 0.2 to 1, more preferably in the range 0.3 to 0.7, especially in the range 0.4 to 0.6.

The mass fraction of wax-containing material in said fluid flow path after contact with said treatment fluid formulation is preferably in the range 0.4 to 0.8.

Preferably, immediately after contact between said wax-containing material and said treatment fluid formulation, the composition in said fluid flow path includes 30 to 80 wt % (preferably 40 to 80 wt %, more preferably 40 to 60 wt %) of material derived from said wax-containing material and 20 to 70 wt %, (preferably 20 to 60 wt %, more preferably 40 to 60 wt %) of material derived from said treatment fluid formulation.

Suitably, immediately after contact between said wax-containing material and said treatment fluid formulation, the composition in said fluid flow path includes at least 20 wt %, preferably at least 25 wt %, more preferably at least 30 wt %, especially at least 40 wt % water; and at least 30 wt %, preferably at least 40 wt %, more preferably at least 50 wt % of said wax-containing material, especially of oil.

The amount of water in the composition in said fluid flow path immediately after contact between said wax-containing material and said treatment fluid formulation is preferably less than 70 wt %, more preferably less than 60 wt %. The amount of water may be in the range 20 to 60 wt %.

Said treatment fluid formulation suitably has a viscosity at 25° C. and $100\,s^{-1}$ of greater than 1 cP, preferably greater than 2 cP. Said treatment fluid formulation preferably has a viscosity under the conditions described of not greater than 50 cP, preferably of 10 cP or less.

Said treatment fluid formulation may include at least 70 wt %, preferably at least 80 wt %, more preferably at least 85 wt %, especially at least 95 wt % water. The amount of water may be less than 99.6 wt %. Said treatment fluid formulation preferably includes 90 to 99.6 wt % water.

Said treatment fluid formulation suitably includes at least 0.2 wt %, preferably at least 0.4 wt %, especially at least 0.5 wt % of said polymeric material AA. Said formulation suitably includes less than 10 wt %, preferably less than 5 wt %, more preferably less than 3 wt %, especially less than 2 wt % of said polymeric material AA.

In a preferred embodiment, said treatment fluid formulation includes 98.0 to 99.6 wt % water and 0.4 to 2.0. wt % of said polymeric material AA; and the ratio of the wt % of said treatment fluid formulation to the wt % of said wax-containing material contacted in the method is in the range 0.5 to 1.5.

Water for use in the treatment fluid formulation may be derived from any convenient source. It may be potable water, surface water, sea water, aquifer water, deionised production water and filtered water derived from any of the aforementioned sources.

Said polymeric material AA is preferably soluble in water at 25° C. Preferably, when said polymeric material AA is not cross-linked, polymeric material AA in said treatment fluid formulation is wholly or partially dissolved therein to define a solution or dispersion.

Whilst the applicant does not wish to be bound by any theory, said optionally cross-linked polymeric material AA may be arranged to adsorb onto the surface of particles of the viscous composition, whereby the coated particles may be hindered from agglomerating. Said polymeric material AA is preferably not a conventional surfactant having a hydrophobic portion, for example a hydrophobic tail and a hydrophilic portion, for example an ionic head. Thus, it is believed that formation of said coated particles preferably does not involve a hydrophobic tail part interacting with, for example oil, and a hydrophilic part interacting with, for example water.

Said polymeric backbone of polymeric material AA preferably includes carbon atoms. Said carbon atoms are preferably part of —$CH_2$— moieties. Preferably, a repeat unit of said polymeric backbone includes carbon to carbon bonds, preferably C—C single bonds. Preferably, said polymeric material AA includes a repeat unit which includes a —$CH_2$— moiety. Preferably, said polymeric backbone does not include any —O— moieties, for examples —C—O— moieties such as are found in an alkyleneoxy polymer, such as polyethyleneglycol. Said polymeric backbone is preferably not defined by an aromatic moiety such as a phenyl moiety such as is found in polyethersulphones. Said polymeric backbone preferably does not include any —S— moieties. Said polymeric backbone preferably does not include any nitrogen atoms. Said polymeric backbone preferably consists essentially of carbon atoms, preferably in the form of C—C single bonds.

Said treatment fluid formulation may comprise a polyvinylalcohol or polyvinylacetate.

Said —O— moieties are preferably directly bonded to the polymeric backbone.

Said polymeric material AA preferably includes, on average, at least 10, more preferably at least 50, —O— moieties pendent from the polymeric backbone thereof. Said —O— moieties are preferably a part of a repeat unit of said polymeric material AA.

Preferably, said —O— moieties are directly bonded to a carbon atom in said polymeric backbone of polymeric material AA, suitably so that said polymeric material AA includes a moiety (which is preferably part of a repeat unit) of formula:

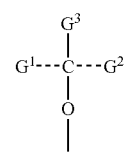

II where $G^1$ and $G^2$ are other parts of the polymeric backbone and $G^3$ is another moiety pendent from the polymeric backbone. Preferably, $G^3$ represents a hydrogen atom.

Preferably, said polymeric material AA includes a moiety

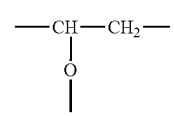

III

Said moiety III is preferably part of a repeat unit. Said moiety III may be part of a copolymer which includes a repeat unit which includes a moiety of a different type compared to moiety III. Suitably, at least 60 mole %, preferably at least 80 mole %, more preferably at least 90 mole % of polymeric material AA comprises repeat units which comprise (preferably consists of) moieties III. Preferably, said polymeric material AA consists essentially of repeat units which comprise (preferably consist of) moieties III.

Suitably, 60 mole %, preferably 80 mole %, more preferably 90 mole %, especially substantially all of said polymeric material AA comprises vinyl moieties which are optionally cross-linked.

Preferably, the free bond to the oxygen atom in the —O— moiety pendent from the polymeric backbone of polymeric material AA (and preferably also in moieties II and III) is bonded to a group $R^{10}$ (so that the moiety pendent from the polymeric backbone of polymeric material AA is of formula —O—$R^{10}$) Preferably group $R^{10}$ comprises fewer than 10, more preferably fewer than 5, especially 3 or fewer carbon atoms. It preferably only includes atoms selected from carbon, hydrogen and oxygen atoms. $R^{10}$ is preferably selected from a hydrogen atom and an alkylcarbonyl, especially a methylcarbonyl group. Preferably moiety —O— $R^{10}$ in said polymeric material AA is an hydroxyl or acetate group.

Said polymeric material AA may include a plurality, preferably a multiplicity, of functional groups (which incorporate the —O— moieties described) selected from hydroxyl and acetate groups. Said polymeric material preferably includes at least some groups wherein $R^{10}$ represents an hydroxyl group. Suitably, at least 30%, preferably at least 50%, especially at least 80% of groups $R^{10}$ are hydroxyl groups. Said polymeric material AA preferably includes a multiplicity of hydroxyl groups pendent from said polymeric backbone; and also includes a multiplicity of acetate groups pendent from the polymeric backbone.

The ratio of the number of acetate groups to the number of hydroxyl groups in said polymeric material AA is suitably in the range 0 to 3, is preferably in the range 0.1 to 2, is more preferably in the range 0.1 to 1.

Preferably, substantially each free bond to the oxygen atoms in —O— moieties pendent from the polymeric backbone in polymeric material AA, except for any free bonds which are involved in cross-linking the polymeric material AA, is of formula —O—$R^{10}$ wherein each group —$OR^{10}$ is selected from hydroxyl and acetate.

Preferably, said polymeric material AA includes a vinyl alcohol moiety, especially a vinyl alcohol moiety which repeats along the backbone of the polymeric material. Said polymeric material AA preferably includes a vinyl acetate moiety, especially a vinylacetate moiety which repeats along the backbone of the polymeric material. Polyvinylalcohol is generally made by hydrolysis of polyvinylacetate. Said polymeric material AA may comprise a 0-100% hydrolysed, preferably a 5 to 95% hydrolysed, more preferably a 60 to 90%, especially a 70 to 90% hydrolysed polyvinylacetate Said polymeric material AA may have a number average molecular weight (Mn) of at least 10,000, preferably at least 50,000, especially at least 75,000. Mn may be less than 500,000, preferably less than 400,000. Said polymeric material AA is preferably a polyvinyl polymer. Said polymeric material AA may be a copolymer.

Said polymeric material AA is preferably a polyvinyl alcohol polymer or copolymer.

Preferably, said polymeric material AA includes at least one vinyl alcohol/vinyl acetate copolymer which may include greater than 5%, suitably includes greater than 30%, preferably greater than 65%, more preferably greater than 80% of vinyl alcohol moieties.

Said polymeric material AA may be a random or block copolymer.

As described above, polymeric material AA is optionally cross-linked. A cross-linked material may be used in the method when the chemical or physical conditions to which the treatment fluid formulation may be subjected and/or during flow in a conduit means, for example in said first conduit part (when provided) as described above, may be relatively harsh. In many applications, it is not necessary to cross-link polymeric material AA.

Preferably, polymeric material AA is not cross-linked.

When a cross-linked material is used in the method, said method preferably comprises selecting a said polymeric material AA; selecting a material BB which includes a functional group which is able to react in the presence of said polymeric material AA to cross-link polymeric material AA and form a polymeric material CC; and causing the formation of said polymeric material CC by a reaction involving said polymeric material AA and material BB.

Preferably, formation of said polymeric material CC from said polymeric material AA and material BB involves a condensation reaction. Preferably, formation of said polymeric material CC involves an acid catalysed reaction.

Preferably, said polymeric material AA and material BB include functional groups which are arranged to react, for example to undergo a condensation reaction, thereby to form said polymeric material CC. Preferably, said polymeric material AA and material BB include functional groups which are arranged to react for example to undergo an acid catalysed reaction thereby to form said polymeric material CC.

Said material BB may be an aldehyde, carboxylic acid, urea, acroleine, isocyanate, vinyl sulphate or vinyl chloride of a diacid or include any functional group capable of condensing with one or more groups on said polymeric material AA. Examples of the aforementioned include formaldehyde, acetaldehyde, glyoxal and glutaraldehyde, as well as maleic acid, oxalic acid, dimethylurea, polyacroleines, diisocyanates, divinyl sulphate and the chlorides of diacids.

Said material BB is preferably an aldehyde containing or generating compound. Preferably, material BB is an aldehyde containing compound and more preferably includes a plurality of aldehyde moieties. Said aldehyde containing compound may be of formula IV as described in WO98/12239 the contents of which is incorporated herein.

The wax-containing material which is contacted in accordance with said first aspect may comprise a wax-containing crude oil which has been pretreated during its passage from a reservoir to a position wherein it is contacted with said treatment fluid formulation. Accordingly, the method of the first aspect may include a pre-treatment step which comprises contacting a wax-containing crude oil with a pre-treatment fluid thereby to prepare the wax-containing material for contact with the treatment fluid formulation of the first aspect. Preferably, in the pre-treatment step, the wax-containing crude oil and pre-treatment fluid are mixed.

Said pre-treatment fluid preferably comprises a chemical arranged to reduce the pour point (suitably by at least 1° C., preferably at least 2° C., more preferably at least 5° C.) of the wax-containing crude oil. The chemical may be a wax inhibitor or wax dispersant. It may be a known material for reducing the pour point of a wax-containing crude oil. It may be a surface active agent, polymer, solvent or even a wax. It is preferably a surface active agent, for example a surfactant.

Said chemical may be an alcohol or aromatic compound, a hydrocarbon, naphthalene, an amine salt of a sulphonic acid, a long chain alkyl ester, a lignin based system, a sulphonic acid based system, a naphthalene sulphonic acid condensate, a solvent such as kerosene or naphthalene.

Surprisingly, it has been found that the use of a pre-treatment as described acts synergistically with the treatment fluid formulation to reduce the pour point. More particularly, the sum of the reduction in pour point in using the pre-treatment fluid alone or in using the treatment fluid formulation alone is significantly less than achieved when pre-treatment precedes use of the treatment fluid formulation.

Suitably, a chemical used in the pre-treatment will be dissolved or dispersed in a carrier prior to contact with said wax-containing crude oil. Said carrier is preferably a carrier solvent which is preferably hydrophobic and especially comprise a hydrocarbon with kerosene and/or naphthalene being preferred.

Preferably, the pre-treatment step is carried out at a temperature at or above the pour point of the wax-containing crude oil. It is preferably carried out downstream of an oil reservoir and preferably downstream of a point wherein light fractions of the oil have been removed, for example by them being flared off.

The wax-containing material which is contacted with said treatment fluid formulation in accordance with said first aspect may itself by post-treated to further decrease its pour point. For example, it may be contacted with a conventional surface active agent, for example dispersant, such as a lignosulphonate or the like.

After the wax-containing material has been delivered to a desired location (for example a refinery) the wax-containing material may be caused to separate from other components of the treatment fluid formulation. This may be achieved by simply reducing any mixing or turbulent movement of the mixture and allowing the wax-containing material to settle out from the water and optionally cross-linked polymeric material AA (which may be substantially soluble in the water under the conditions of settling). The rate of settling may be increased by increasing the temperature of the wax-containing material. Additionally, the wax-containing material may be diluted with light oil or mechanical means may be used to encourage settling.

The method of the first aspect preferably includes the step of separating at least a part of the treatment fluid formulation from the wax-containing material after the wax-containing material has flowed along said fluid flow path. After separation, said wax-containing material suitably includes less than 10 wt %, preferably less than 5 wt %, especially less than 2 wt % water. After separation said wax-containing material suitably includes less than 2 wt %, preferably less than 1 wt %, more preferably less than 0.5 wt %, especially less than 0.2 wt %, of said optionally-cross-linked polymeric material AA.

When the method includes the separating step as described, the treatment fluid formulation which is separated from the wax-containing material may be re-used to treat further wax-containing material. For example, the method may involve a continuous or semi-continuous process wherein treatment fluid formulation is contacted with wax-containing material, the mixture is then caused to flow downstream along a fluid flow path thereby to deliver the viscous composition to a desired location; the wax-containing material and treatment fluid formulation are separated; the wax-containing material is used and/or stored as required in said desired location; the treatment fluid formulation is delivered to a location thereby to contact further wax-containing material upstream of said desired location; and the process is suitably repeated.

According to a second aspect of the present invention there is provided a method of preparing a treatment fluid formulation (e.g. for treating a wax-containing material) comprising:
    contacting an optionally cross-linked polymeric material AA as described according to the first aspect with water.

Preferably, the polymeric material AA is dissolved in the water thereby to prepare an aqueous solution of said polymeric material AA. Preferably, the polymeric material AA is in the form of a solid prior to contact with water.

Preferably, at least 100 litres more preferably at least 1000 litres of said treatment fluid formulation is prepared.

When the treatment fluid formulation is cross-linked, the method may comprise: selecting a polymeric material AA (for example a polyvinylalcohol) and a material BB as described according to said first aspect; and
    causing the formation of a said polymeric material CC by a reaction involving said polymeric material AA and said material BB.

Preferably, however, said treatment fluid formulation is not cross-linked.

According to a third aspect of the invention, there is provided a treatment fluid formulation comprising:
    at least 98 wt % water
    2 wt % or less of said polymeric material AA which has optionally been cross-linked as described above.

According to a fourth aspect of the invention, there is provided a fluid flow path, for example a conduit means (preferably having a cross-sectional diameter at least in part of at least 5 cm and a length of at least 5 m) which contains a fluid comprising wax-containing material, water and an optionally cross-linked polymeric material AA as described herein.

The invention extends to the use of a treatment fluid formulation for treating a wax-containing material for improving the mobility thereof, said treatment fluid formulation comprising a polymeric material AA which includes —O— moieties pendent from a polymeric backbone thereof, wherein polymeric material AA is optionally cross-linked.

Any feature of any aspect of any invention or embodiment described herein may be combined with any feature of any aspect of any other invention or embodiment described herein mutatis mutandis.

Specific embodiments of the invention will now described, by way of example, with reference to the accompanying figures in which FIGS. 1 to 4 are plots of viscosity vs temperature for various untreated or treated crude oils.

EXAMPLE 1

Preparation of Polyvinylalcohol Aqueous Solutions

A 10 wt % poly(vinylalcohol) solution was prepared by slowly stirring a known amount of water and adding a known amount of 88% hydrolysed poly(vinylalcohol) of molecular weight 300,000 to the stirred water. The suspension was stirred for 1 hour and, thereafter, the suspension was heated at a temperature of 60° C. until the suspended particles dissolved and the solution was clear. The solution was then allowed to cool to less than 5° C. and maintained at this temperature until used.

0.5 to 2 wt % polyvinylalcohol solutions were made by diluting the 10 wt % solution with tap water.

EXAMPLE 2

General Procedures for Treating Crude Oils

Crude oil was heated to above its wax appearance temperature (WAT) and then treated with a selected polyvinylalcohol solution prepared as described in Example 1. The treatment with the solution may be preceded by pre-treatment steps 1 or 2 described below. The treatment with the solution may be succeeded by post-treatment step 1 described below.

(i) Pre-treatment step 1—with the crude oil above its WAT a selected inhibitor is added and hand shaken (up and down hand shakes) 200 times followed by incubation at 85° C. for a period of 1 hour.

(ii) Pre-treatment step 2—with the crude oil above its WAT a selected inhibitor dissolved or dispersed in an organic solvent is added and hand shaken (up and down hand shakes) 200 times followed by incubation at 85° C. for a period of 1 hour.

(iii) Treatment with polyvinylalcohol solution—the solution is either added directly to crude oil with the oil above its WAT or, if pre-treatment step 1 or step 2 is undertaken, it is added to the products of the pre-treatment steps, again with the oil-containing material at a temperature above its WAT. After addition of the polyvinylalcohol solution, the mixture is brought to a temperature above the WAT and held for 1 hour. Thereafter, the mixture is hand-shaken 50 times to form a dispersion which is subjected to high shear for 5 minutes.

(iv) Post-treatment—The dispersion prepared in (iii) is contacted with a dispersant, for example, a lignosulphonate.
Testing of Materials After completion of the treatment(s) referred to in Example 2, the mixtures containing the oil and optional polyvinylalcohol, solvents and inhibitors were tested to assess their pour points and/or to construct viscosity vs temperature graphs as follows:

Pour point assessment—An approximation to the value for the pour point is obtained as follows:

The apparatus for measuring the pour point consists of an insulated 300 ml beaker, 1 large magnetic stirrer bar, 1 temperature probe and a stirrer hot plate.

100 ml of a formulation to be analysed is placed in the beaker containing the magnetic stirrer bar. The stirrer is set to position 2.5 and the hotplate to 50 which equates to 45° C. approximately. The fluid is allowed to stabilise at 45° C. for 10 minutes and then the hotplate is turned off and the solution left to cool. The pour point/mobility point is designated as the point at which the stirrer bar will not turn anymore, i.e. the dispersion has separated and agglomerated.

Preparation of graphs—Samples were heated to 55° C. and the viscosity assessed at $100s^{-1}$ whilst the temperature was reduced.

EXAMPLES C1, C2 AND 3 TO 8

Oils treated and/or tested as described in Example 2 were investigated. The nature of the treatments and results are provided in Table 1 and the figures.

EXAMPLE 9

Figure 4:
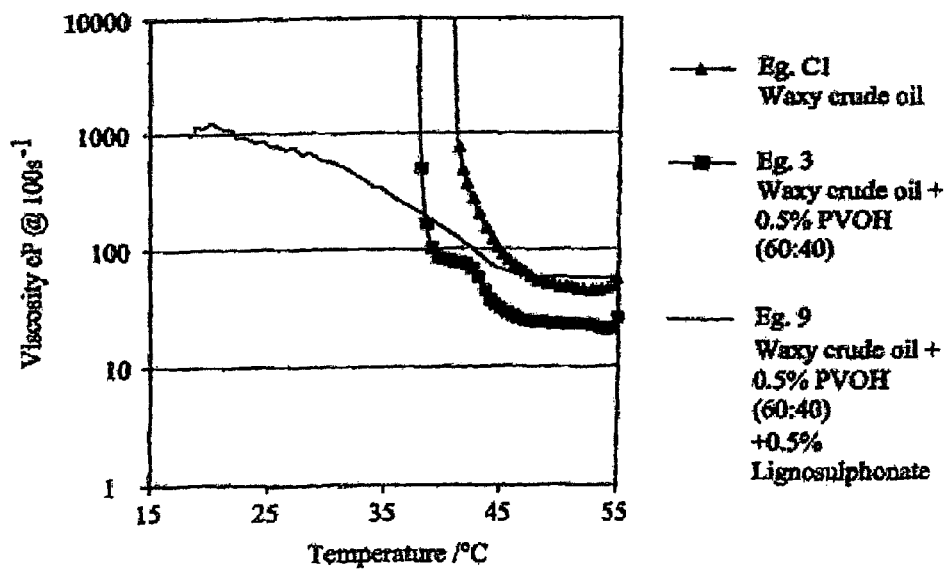

In this example, a lignosulphonate dispersant (0.5 wt %) was added to the formulation of Example 3 in a post-treatment in accordance with treatment (iv) above. FIG. 4 exemplifies the results.
Discussion Treatment with polyvinylalcohol solution has been shown to provide a significant decrease in pour point. If oil is pre-treated with a conventional inhibitor and/or solvent prior to treatment with polyvinylalcohol solution then there is a synergistic improvement in the pour point.

The invention claimed is:
1. A method of treating a wax-containing material for improving the mobility thereof, wherein said wax-containing material is arranged to flow along a fluid flow path and has a Wax Appearance Temperature (WAT) before contact with a treatment fluid formulation of less than 100° C., said method comprising contacting the wax-containing material in said fluid flow path with a said treatment fluid formulation, said treatment fluid formulation comprising a polymeric material AA which includes —O— moieties pendent from a polymeric backbone thereof, wherein polymeric material AA is optionally cross-linked and wherein said treatment fluid formulation is initially contacted with said wax-containing material in said fluid flow path below ground.

2. A method according to claim 1, wherein said wax-containing material has a Wax Appearance Temperature (WAT) before contact with said treatment fluid formulation of less than 80° C.

3. A method according to claim 1, wherein said wax-containing material has a pour point measured in accordance with ASTM D97 of less than 150° C.

4. A method according to claim 1, wherein said wax-containing material comprises a material derived from an heavy oil reservoir and/or from tar sand deposits.

5. A method according to claim 1, wherein said treatment fluid formulation is initially contacted with said wax-containing material at or downstream of a position in a fluid flow path wherein light fractions of a live oil have been removed.

6. A method according to claim 1, wherein said wax-containing material is at a temperature above its pour point when initially contacted with said treatment fluid formulation.

7. A method according to claim 1, wherein said treatment fluid formulation is arranged to disperse and/or emulsify said wax-containing material on contact therewith.

8. A method according to claim 1, wherein the mass fraction of wax-containing material in said fluid flow path after contact with said treatment fluid formulation is in the range 0.4 to 0.8.

9. A method according to claim 1, wherein immediately after contact between said wax-containing material and said treatment fluid formulation, the composition in said fluid flow path includes at least 40 wt % of water and at least 50 wt % of said wax-containing material.

Figure 2:
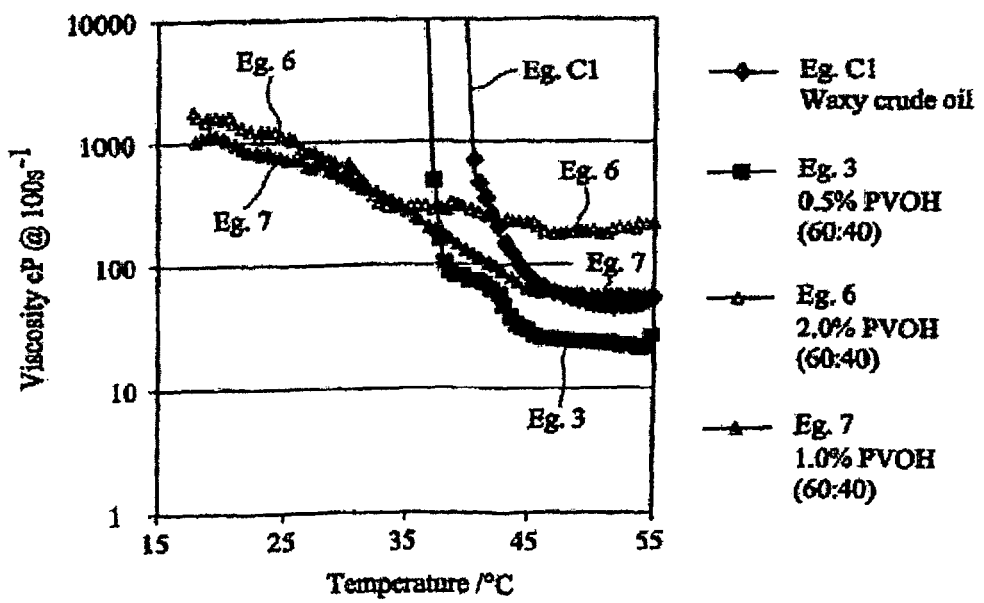
Figure 3:
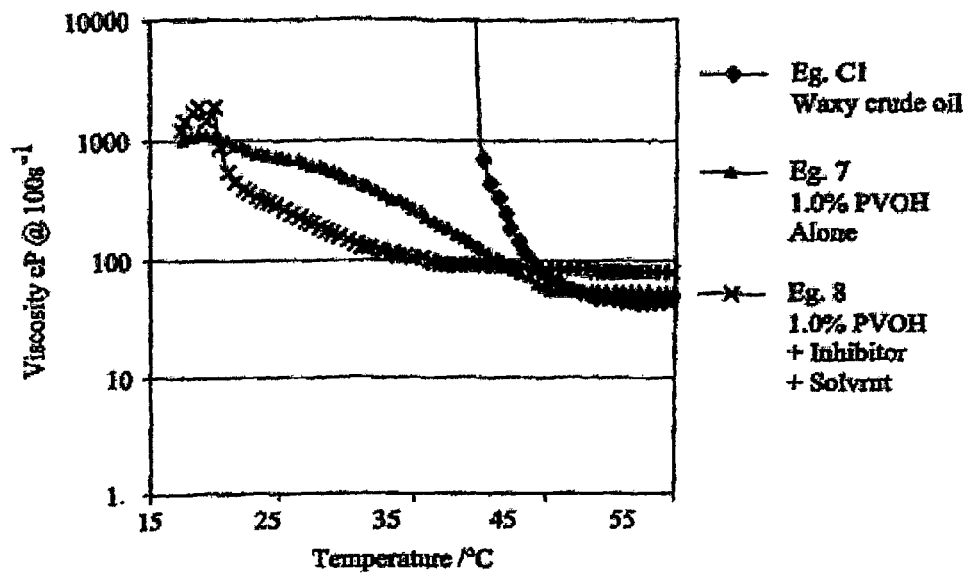

| Example No | Step No | Pre-Treatment | | Polyvinylalcohol treatment | | Pour Point ° C. | Viscosity v temperature graph |
|---|---|---|---|---|---|---|---|
| | | Inhibitor type and amount (based on weight of oil) | Solvent type and amount based on weight of oil | Concentrations of polyvinyl alcohol solution (wt %) | Ratio of polyvinylalcohol solution to oil | | |
| C1 | — | — | — | — | — | 42 | See FIG. 1 |
| C2 | 1 | An $C_{3-10}$ aromatic/alcohol combination 3000 ppm | — | — | — | 30 | — |
| 3 | — | — | — | 0.5 | 60:40 | 35 | See FIG. 1 |
| 4 | 1 | An $C_{3-10}$ aromatic/alcohol combination 3000 ppm | — | 0.5 | 60:40 | 29 | See FIG. 1 |
| 5 | 2 | An $C_{3-10}$ aromatic/alcohol combination 3000 ppm | Kerosene, 10 wt % | 0.5 | 60:40 | 25 | See FIG. 1 |
| 6 | — | — | — | 2.0 | 60:40 | 26 | See FIG. 2 |
| 7 | — | — | — | 1.0 | 60:40 | 32-34 | See FIGS. 2 and 3 |
| 8 | 2 | An $C_{3-10}$ aromatic/alcohol combination 3000 ppm | Kerosene, 10 wt % | 1.0 | 60:40 | 18-20 | See FIG. 3 |

10. A method according to claim 1, wherein said treatment fluid formulation includes at least 95 wt % water.

11. A method according to claim 1, wherein said treatment fluid formulation includes at least 0.2 wt % of said polymeric material AA and less than 10 wt % of said polymeric material AA.

12. A method according to claim 1, wherein said treatment fluid formulation includes 98.0 to 99.6 wt % water and 0.4 to 2.0 wt % of said polymeric material AA; and the ratio of the wt % of said treatment fluid formulation to the wt % of said wax-containing material contacted in the method is in the range 0.5 to 1.5.

13. A method according to claim 1, wherein said polymeric material AA includes a moiety of formula:

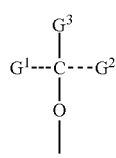

II where $G^1$ and $G^2$ are other parts of the polymeric backbone and $G^3$ is another moiety pendent from the polymeric backbone.

14. A method according to claim 1, wherein said polymeric material AA includes a moiety

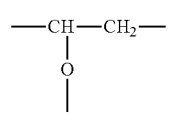

III

15. A method according to claim 1, wherein the ratio of the number of acetate groups to the number of hydroxyl groups in said polymeric material AA is in the range 0.01 to 1.

16. A method according to claim 1, wherein said polymeric material AA has a number average molecular weight (Mn) of at least 10,000 and less than 500,000.

17. A method according to claim 1, wherein said polymeric material AA is a polyvinyl alcohol polymer or copolymer.

18. A method according to claim 1, which includes the step of separating at least a part of the treatment fluid formulation from the wax-containing material after the wax-containing material has flowed along said fluid flow path.

19. A method according to claim 1, wherein said polymeric material AA comprises 70 to 90% hydrolyzed polyvinylacetate.

20. A method according to claim 1, wherein a delivery flow path is defined which is arranged to communicate with said fluid flow path wherein said treatment fluid formulation is dosed into said wax-containing material in said fluid flow path via said delivery flow path.

21. A method according to claim 20, wherein the ratio of the flow rate (in weight per unit time) of treatment fluid formulation in said delivery flow path to the flow rate (in the same unit) of wax-containing material in said fluid flow path is in the range 0.1 to 2.5.

22. A method according to claim 1, which includes a pre-treatment step which comprises contacting a wax-containing crude oil with a pre-treatment fluid thereby to prepare the wax-containing material for contact with the treatment fluid formulation in the method.

23. A method according to claim 22, wherein said pre-treatment fluid comprises a chemical arranged to reduce the pour point of the wax-containing crude oil.

24. A method according to claim 22, wherein said pre-treatment fluid is an alcohol or aromatic compound, a hydrocarbon, naphthalene, an amine salt of a sulphonic acid; a long chain alkyl ester, a lignin based system, a sulphonic acid based system, a naphthalene sulphonic acid condensate or a solvent, for example kerosene or naphthalene.

25. A method of treating a wax-containing material for improving the mobility thereof, wherein said wax-containing material is arranged to flow along a fluid flow path and has a Wax Appearance Temperature (WAT) before contact with a treatment fluid formulation of less than 100° C., said method comprising contacting the wax-containing material in said fluid flow path with a said treatment fluid formulation, said treatment fluid formulation comprising a polymeric material AA having a number average molecular weight of at least 10,000 and less than 400,000, said polymeric material AA including —$OR^{10}$ moieties pendent from a polymeric backbone thereof, wherein at least 50% of groups —O—$R^{10}$ are hydroxyl groups and wherein said treatment fluid formulation is initially contacted with said wax-containing material in said fluid flow path below ground.

26. A method of treating a wax-containing material for improving the mobility thereof, wherein said wax-containing material is arranged to flow along a fluid flow path and has a Wax Appearance Temperature (WAT) before contact with a treatment fluid formulation of less than 100° C., said method comprising contacting the wax-containing material in said fluid flow path with a said treatment fluid formulation, said treatment fluid formulation comprising a polymeric material AA which comprises 70 to 90% hydrolysed polyvinylacetate, wherein said treatment fluid formulation is initially contacted with said wax-containing material in said fluid flow path below ground and wherein immediately after contact between said wax-containing material and said treatment fluid formulation, the composition in said fluid flow path includes at least 40 wt % water.

* * * * *